United States Patent
Kikuchi (10) Patent No.: US 10,007,100 B2
(45) Date of Patent: Jun. 26, 2018

(54) LIGHT SHEET ILLUMINATION MICROSCOPE AND LIGHT SHEET ILLUMINATION METHOD

(71) Applicant: OLYMPUS CORPORATION, Shibuya-ku, Tokyo (JP)

(72) Inventor: Yu Kikuchi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days. days.

(21) Appl. No.: 14/924,435

(22) Filed: Oct. 27, 2015

(65) Prior Publication Data
US 2016/0124201 A1 May 5, 2016

(30) Foreign Application Priority Data

Nov. 4, 2014 (JP) .................................. 2014-224199
Sep. 3, 2015 (JP) .................................. 2015-174143

(51) Int. Cl.
*G02B 21/00* (2006.01)
*G02B 21/16* (2006.01)

(52) U.S. Cl.
CPC ......... *G02B 21/0048* (2013.01); *G02B 21/16* (2013.01)

(58) Field of Classification Search
CPC . G02B 21/00; G02B 21/0004–21/0036; G02B 21/0048; G02B 21/006; G02B 21/0076; G02B 21/06; G02B 21/16; G02B 21/18; G02B 21/08–21/14; G01Q 60/18; G01Q 60/20
See application file for complete search history.

(56) References Cited

U.S. PATENT DOCUMENTS

| 7,554,725 | B2 | 6/2009 | Stelzer et al. | |
|---|---|---|---|---|
| 8,970,950 | B2 | 3/2015 | Stelzer | |
| 2008/0151238 | A1* | 6/2008 | Zhu | G02B 21/06 356/317 |
| 2009/0225413 | A1 | 9/2009 | Stelzer et al. | |
| 2011/0304723 | A1* | 12/2011 | Betzig | G02B 21/002 348/79 |
| 2012/0206798 | A1* | 8/2012 | Knop | G02B 21/002 359/385 |
| 2014/0042339 | A1 | 2/2014 | Stelzer et al. | |
| 2015/0198794 | A1* | 7/2015 | Rondeau | G02B 21/0048 359/390 |

FOREIGN PATENT DOCUMENTS

| JP | 2011215644 A | 10/2011 |
|---|---|---|
| WO | 2011120629 A1 | 10/2011 |

* cited by examiner

*Primary Examiner* — Stephone B Allen
*Assistant Examiner* — Adam W Booher
(74) *Attorney, Agent, or Firm* — Holtz, Holtz & Volek PC (57) ABSTRACT

A light sheet illumination microscope includes a detection optical system and an illumination optical system. The illumination optical system includes a first optical element for forming a sheet-shaped illumination beam that travels in a first direction and that has a width in a second direction that is perpendicular to both the optical axis of the detection optical system and the first direction in a specimen, and a scanner that relatively scans the specimen with the sheet-shaped illumination beam in the second direction.

2 Claims, 9 Drawing Sheets

LIGHT SHEET ILLUMINATION MICROSCOPE AND LIGHT SHEET ILLUMINATION METHOD

CROSS REFERENCE TO RELATED APPLICATIONS

This application is based upon and claims the benefit of priority from prior Japanese Patent Applications No. 2014-224199, filed Nov. 4, 2014 and No. 2015-174143, filed Sep. 3, 2015, the entire contents of which are incorporated herein by this reference.

BACKGROUND OF THE INVENTION

Field of the Invention

The present invention relates to a light sheet illumination microscope that irradiates a specimen with a sheet-shaped illumination beam, and a light sheet illumination method.

Description of the Related Art

In the field of fluorescence microscopy, a technology for irradiating a specimen with a laser beam from a direction perpendicular to the optical axis of a detection optical system so as to acquire a three-dimensional image having a high resolution is known. Such a technology is disclosed, for example, in Japanese Laid-open Patent Publication No. 2011-215644 and International Publication Pamphlet No. WO 2011/120629.

FIG. 1 of Japanese Laid-open Patent Publication No. 2011-215644 discloses the technology for irradiating a sample with a light strip formed by a cylindrical lens to irradiate the sample with a planar light, rotating the sample, and acquiring a three-dimensional image. Further, FIG. 7 discloses the technology for relatively moving an illumination light path with respect to a sample by beam deflection units, scanning the sample with a linear light formed by a lens that is rotationally symmetric with respect to an illumination-axis line, and acquiring an image.

FIG. 2 of International Publication Pamphlet No. WO 2011/120629 discloses the technology for shifting, by a scanner, a line focus of the excitation light generated by focusing optics on a sample in a direction that is perpendicular to a beam direction. The line focus illustrated in FIG. 2 of International Publication Pamphlet No. WO 2011/120629 is formed along the beam direction.

SUMMARY OF THE INVENTION

An aspect of the present invention provides a light sheet illumination microscope that includes a detection optical system, and an illumination optical system including a first optical element for forming a sheet-shaped illumination beam that travels in a first direction that is perpendicular to an optical axis of the detection optical system and that has a width in a second direction that is perpendicular to both the optical axis of the detection optical system and the first direction in a specimen, and a scanner that relatively scans the specimen in the second direction with the sheet-shaped illumination beam.

Another aspect of the present invention provides a light sheet illumination method for forming an sheet-shaped illumination beam that travels in a first direction that is perpendicular to an optical axis of a detection optical system and that has a width in a second direction that is perpendicular to both the optical axis of the detection optical system and the first direction in a specimen, and for relatively scanning the specimen in the second direction with the sheet-shaped illumination beam.

BRIEF DESCRIPTION OF THE DRAWINGS

The present invention will be more apparent from the following detailed description when the accompanying drawings are referenced.

FIGS. 1A and 1B illustrate a configuration of a microscope apparatus according to a first embodiment of the present invention, in which

FIGS. 2A and 2B illustrate a modification of the configuration of the light sheet illumination device according to the first embodiment of the present invention, in which

FIGS. 3A and 3B illustrate a configuration of alight sheet illumination device according to a second embodiment of the present invention, in which

FIGS. 4A and 4B illustrate a modification of the configuration of the light sheet illumination device according to the second embodiment of the present invention, in which

FIGS. 5A and 5B illustrate another modification of the configuration of the light sheet illumination device according to the second embodiment of the present invention, in which

FIGS. 6A and 6B illustrate a configuration of a light sheet illumination device according to a third embodiment of the present invention, in which

FIGS. 7A and 7B illustrate a configuration of a light sheet illumination device according to a fourth embodiment of the present invention, in which

FIGS. 8A and 8B illustrate a configuration of a light sheet illumination device according to a fifth embodiment of the present invention, in which FIGS. 9A and 9B illustrate a configuration of a light sheet illumination device according to a sixth embodiment of the present invention, in which

DESCRIPTION OF THE EMBODIMENTS

When using the technology illustrated in FIG. 1 of Japanese Laid-open Patent Publication No. 2011-215644, a width of a light strip needs to be increased to fit the size of a target area to be observed if the target area is wider than a planar area in which a light strip is formed. That results in reducing a light intensity of an illumination light with which is irradiated for each unit area of the target area. Accordingly, it is hard to obtain an appropriate light intensity, and then, a high output of a light source is needed.

Further, when using the technology illustrated in FIG. 7 of Japanese Laid-open Patent Publication No. 2011-215644 and the technology illustrated in FIG. 2 of International Publication Pamphlet No. WO 2011/120629, an excitation light is linearly converged on the optical axis of the excitation light in a specimen. Thus, compared with using the technology illustrated in FIG. 1 of Japanese Laid-open Patent Publication No. 2011-215644, the intensity of excitation light for each unit area is higher, which greatly damages the specimen, and as a result, the specimen is readily faded.

In light of the description above, embodiments of the present invention will now be described.

First Embodiment

Figure 1A:
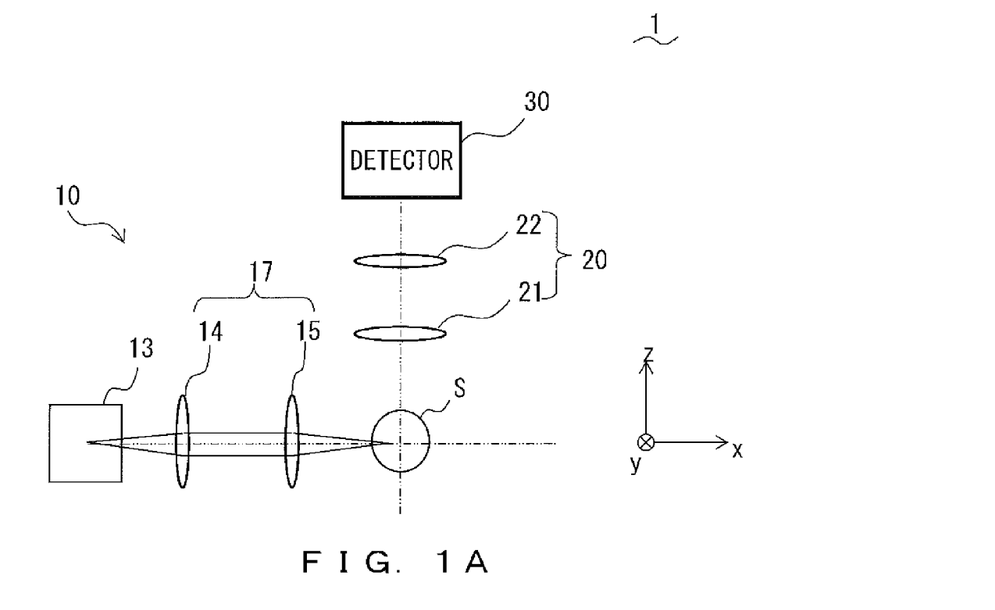
FIG. 1A illustrates the configuration of the microscope apparatus as viewed from the side.
Figure 1B:
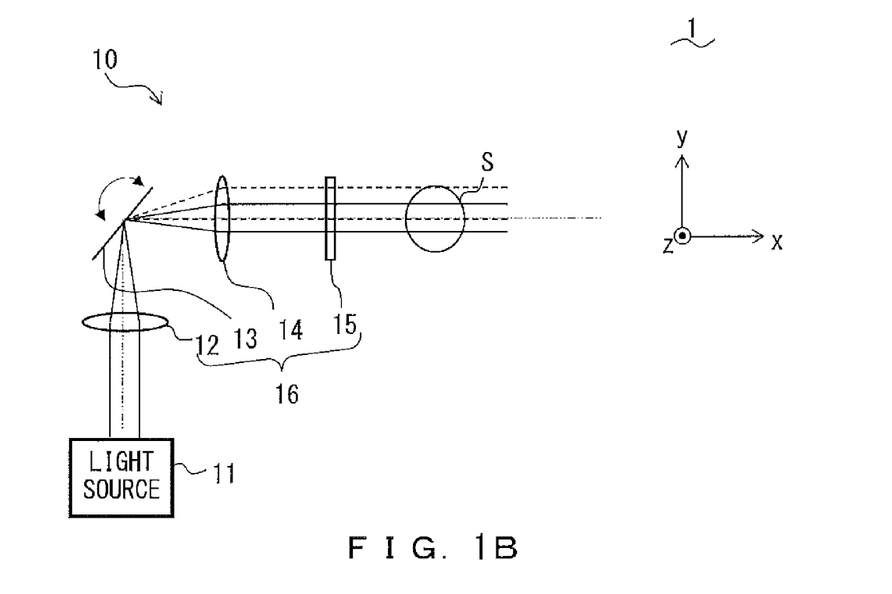
FIG. 1B illustrates the configuration of the microscope apparatus as viewed from above.

FIGS. 1A and 1B illustrate a configuration of a microscope apparatus 1 according to the present embodiment. The microscope apparatus 1 is, for example, a fluorescence microscope that detects fluorescence from a biological specimen. The microscope apparatus 1 is a light sheet illumination microscope that includes a light sheet illumination device 10 irradiating a specimen S with a sheet-shaped illumination beam. The microscope apparatus 1 further includes a detection optical system 20 that has an optical axis perpendicular to the direction in which the sheet-shaped illumination beam travels, and a detector 30 that is an imaging device that detects light entering through the detection optical system 20, so as to acquire an image of the specimen S.

The detection optical system 20 includes an objective 21 and a tube lens 22. The detector 30 is an imaging device that includes a two-dimensional imaging element. The detector 30 includes, for example, a CCD or a CMOS as an imaging element, and outputs an image signal of a specimen. The detector 30 is arranged at a focal position of the tube lens 22. The microscope apparatus 1 further includes a control device (not shown) that controls the imaging exposure time. The sheet-shaped illumination beam only illuminates a portion of an imaging target area of the specimen S that is captured by the imaging element without scanning. Thus, the image that is acquired without scanning is to be an image that is a portion of the imaging target area. However, performing at least one scan of the entirety of the specimen permits the entirety of the imaging target area to be illuminated. The control device controls the exposure time to a time period for which the entirety of the imaging target area is scanned, and the entirety of the imaging target area can be captured by the imaging element by integrating signals (that is, by an illumination beam with which the imaging target area is irradiated during the scanning time period). Accordingly, imaging data of the specimen is generated.

The microscope apparatus 1 further includes a z-axis drive mechanism (not shown) that moves the specimen S in the optical-axis direction of the detection optical system 20.

FIG. 1A illustrates the configuration of the microscope apparatus 1 as viewed from the side. FIG. 1B illustrates the configuration of the microscope apparatus 1 as viewed from above. However, in FIG. 1B, the detection optical system 20 and the detector 30 are omitted. An x-y-z coordinate system illustrated in FIGS. 1A and 1B is an orthogonal coordinate system that is defined for convenience to refer to directions herein. A travelling direction of an illumination beam with which the specimen S is irradiated (optical-axis direction on the exit side of an illumination optical system 16) is defined as an x-axis direction. A width direction of the sheet-shaped illumination beam with which the specimen S is irradiated is defined as ay-axis direction, and an optical-axis direction of the detection optical system 20 is defined as a z-axis direction.

The light sheet illumination device 10 includes a light source 11 and the illumination optical system 16 that forms a sheet-shaped illumination beam. The light source 11 is, for example, a laser light source. The light source 11 is configured to emit a collimated laser beam to the illumination optical system 16. The illumination optical system 16 includes a galvanometer mirror 13 for scanning the specimen S with the sheet-shaped illumination beam.

The illumination optical system 16 further includes a cylindrical lens 15, and is an optical system that forms a sheet-shaped illumination beam from a collimated beam. In this case, "being sheet-shaped" refers to "being shaped" to be thick in one of the two directions that are perpendicular to each other and to be thin in another direction. The cylindrical lens 15 has a refractive power in a plane (in an x-z plane) that is formed by the optical axis of the illumination optical system 16 (x-axis direction) and the optical axis of the detection optical system 20 (z-axis direction). The cylindrical lens 15 does not have a refractive power in a plane (in an x-y plane) that is formed by the optical-axis of the illumination optical system 16 (x-axis direction) and the width direction of the sheet-shaped illumination beam (y-axis direction). In other words, the cylindrical lens 15 is an optical element (first optical element) that has a refractive power in the x-z plane and does not have a refractive power in the x-y plane.

More specifically, the illumination optical system 16 includes, in order from the light source 11 side, a first optical system (a lens 12), the galvanometer mirror 13, and a second optical system 17 (a lens 14 and the cylindrical lens 15).

In the light sheet illumination device 10, the first optical system is an optical system that collects light from the light source 11 into a spot on the galvanometer mirror 13. The galvanometer mirror 13 has a rotation axis for scanning the specimen S in the x-y plane and a reflection surface that rotates around the rotation axis. The second optical system 17 includes, in order from the galvanometer mirror 13 side, the lens 14 (second optical element) that has a front focal position on the galvanometer mirror 13 and the cylindrical lens 15. In other words, the second optical system 17 includes the lens 14 in a position closest to the galvanometer mirror 13.

The rotation axis of the galvanometer mirror 13 is preferably located on the reflection surface of the galvanometer mirror 13 or in the proximity of it. The first optical system is preferably configured to collect light substantially on the rotation axis of the galvanometer mirror 13. Further, the lens 14 is preferably configured to have a front focal position substantially on the rotation axis of the galvanometer mirror 13. Furthermore, the lens 14 (second optical element) may appropriately be replaced with a lens that has a different focal length, and the lens may be arranged to have a front focal position on the galvanometer mirror 13.

In the illumination optical system 16, an illumination beam is collected by the lens 12 on the galvanometer mirror 13 and then is converted into a collimated beam by the lens 14, and enters the cylindrical lens 15. Further, as illustrated in FIG. 1A, the illumination beam is collected by the cylindrical lens 15 in the x-z plane in which the cylindrical lens 15 has a refractive power. On the other hand, as illustrated in FIG. 1B, the illumination beam is not collected in the x-y plane in which the cylindrical lens 15 does not have a refractive power. In other words, the cylindrical lens 15 functions as an optical element for forming a sheet-shaped illumination beam that travels in the x-axis direction that is perpendicular to the optical axis of the detection optical system 20 (z-axis direction) and that has a width in the y-axis direction that is perpendicular to both the optical axis of the detection optical system 20 (z-axis direction) and the x-axis direction in the specimen S. Therefore, in principle, the illumination beam is supposed to be an illumination beam that is collected by the illumination optical system 16 into a line that is parallel with the y-axis direction that is perpendicular to the optical-axis direction of the illumination optical system 16 (x-axis direction). However, in reality, at a light collecting position, the illumination beam has a resolution limit that is determined by a numerical aperture of a convergent light and the illumination beam has a focal depth in the x-axis direction, so the illumination beam is not collected into a line. For that reason, the illumination optical system 16 is configured to form a sheet-shaped illumination beam that has a predetermined length in the x-axis direction, that has a substantially constant thickness in the z-axis direction, and that has a width in the y-axis direction.

The galvanometer mirror 13 is a scanner that scans the specimen S in the y-axis direction with the sheet-shaped illumination beam formed by the illumination optical system 16. The galvanometer mirror 13 is arranged so that its rotation axis is parallel with the z-axis direction.

In the light sheet illumination microscope 1 that is configured as described above, if the galvanometer mirror 13 rotates the reflection surface around the rotation axis to change the deflection direction of an illumination beam, it is possible to scan the specimen S with a sheet-shaped illumination beam formed by the illumination optical system 16. Thus, the light sheet illumination microscope 1 permits suppressing of fading of the specimen S and permits illuminating of a target area to be observed with an appropriate light intensity.

Further, in the light sheet illumination microscope 1, an illumination beam is collected on the galvanometer mirror 13, and the front focal position of the lens 14 is located on the galvanometer mirror 13. Thus, regardless of a rotation angle of the galvanometer mirror 13, the illumination beam is converted by the lens 14 into a collimated beam that is parallel with the optical axis of the illumination optical system 16. Beams illustrated by solid lines and beams illustrated by dashed lines in FIG. 1B represent illumination beams deflected in the different directions by the galvanometer mirror 13. Therefore, regardless of a rotation angle of the galvanometer mirror 13, an illumination beam enters the cylindrical lens 15 at a constant angle. In other words, the cylindrical lens 15 is arranged in a position at which the illumination beam enters at a constant angle when the galvanometer mirror 13 scans the specimen S. Accordingly, as illustrated in FIG. 1B, the illumination beam can be shifted by the galvanometer mirror 13 in the y-axis direction that is perpendicular to the optical-axis direction of the illumination optical system 16, without changing the angle at which the illumination beam enters the specimen S.

As described above, scanning with a sheet-shaped illumination beam permits obtaining of a two-dimensional image of a target imaging area using an imaging element. It is possible to obtain a three-dimensional image of the specimen S by moving the specimen S in the optical-axis direction of a detection optical system using a z-axis drive mechanism and by obtaining two-dimensional images one after another.

Figure 2A:
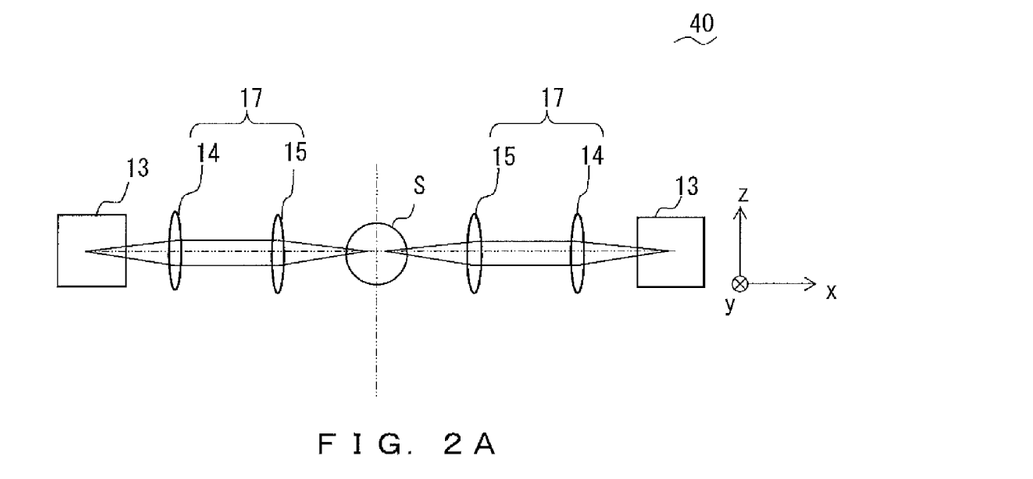
FIG. 2A illustrates the configuration of the light sheet illumination device as viewed from the side.
Figure 2B:
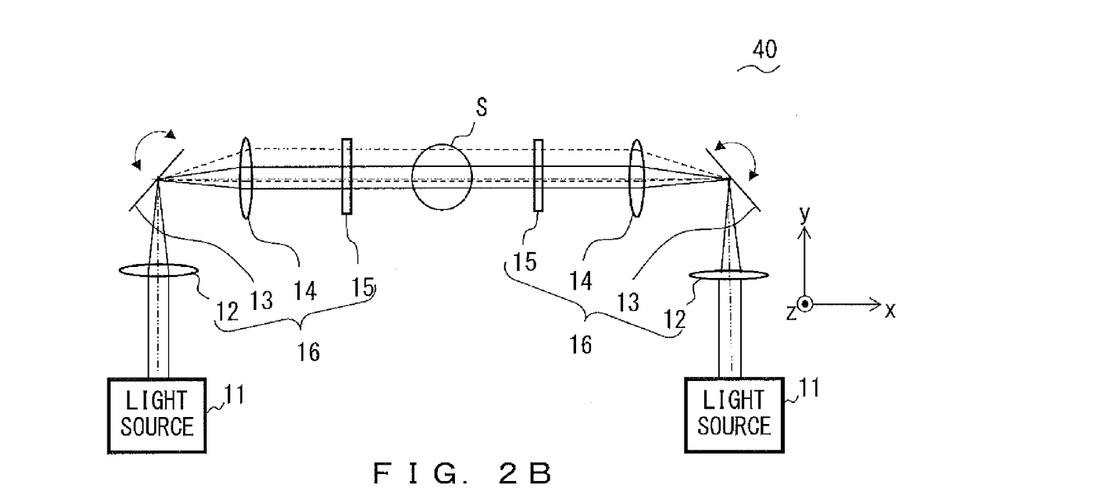
FIG. 2B illustrates the configuration of the light sheet illumination device as viewed from above.

In FIGS. 1A and 1B, the light sheet illumination device 10 includes the galvanometer mirror 13 as a scanner, but the scanner is not limited to the galvanometer mirror 13. Further, the light sheet illumination device 10 has a single illumination optical path, but, instead of the light sheet illumination device 10, the microscope apparatus 1 may include a light sheet illumination device that has a plurality of illumination optical paths. For example, the microscope apparatus 1 may include a light sheet illumination device 40 that has two illumination optical paths, as illustrated in FIGS. 2A and 2B, so as to illuminate the specimen S alternatively from the two illumination optical paths. The light sheet illumination device 40 includes one configuration that is similar to that of the light sheet illumination device 10 on each of the both sides of the position in which the specimen S is arranged.

Second Embodiment

Figure 3A:
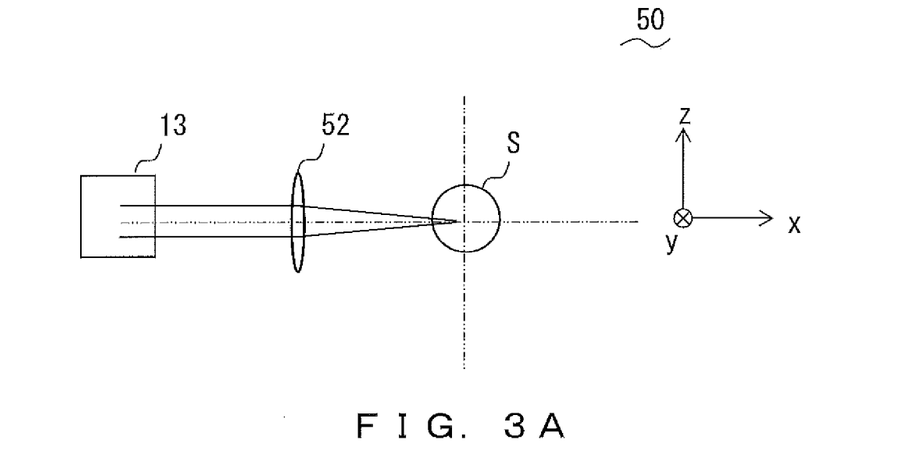
FIG. 3A illustrates the configuration of the light sheet illumination device as viewed from the side.
Figure 3B:
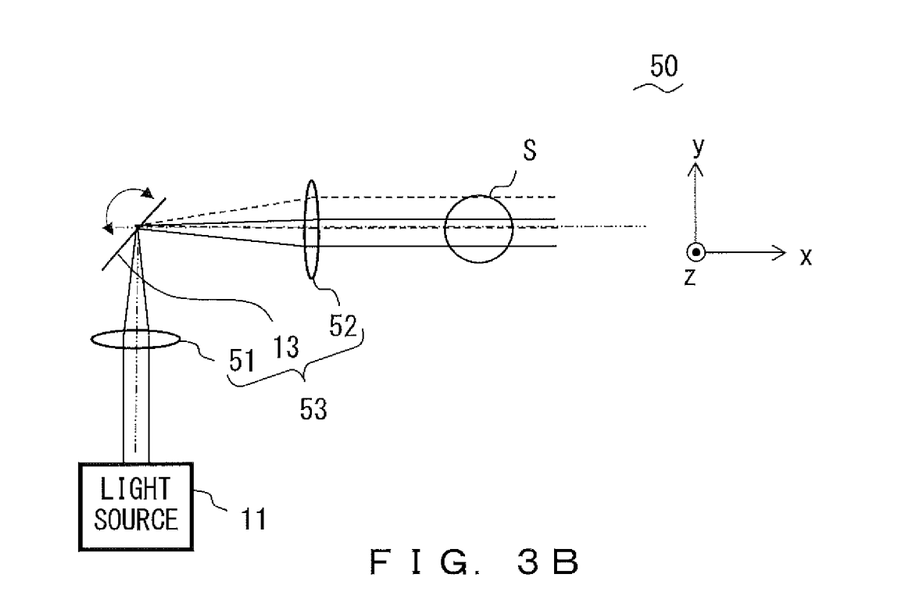
FIG. 3B illustrates the configuration of the light sheet illumination device as viewed from above.

FIGS. 3A and 3B illustrate a configuration of alight sheet illumination device 50 according to the present embodiment. A microscope apparatus according to the present embodiment is a light sheet illumination microscope, and is similar to the microscope apparatus 1 except for including the light sheet illumination device 50 instead of the light sheet illumination device 10 of the microscope apparatus 1. Thus, the detailed description of the microscope apparatus according to the present embodiment will be omitted.

The light sheet illumination device 50 is different from the light sheet illumination device 10 in including an illumination optical system 53 instead of the illumination optical system 16. With respect to the other points, it is similar to the light sheet illumination device 10.

The illumination optical system 53 is similar to the illumination optical system 16 in including the first optical system, the second optical system, and the galvanometer mirror 13. However, the illumination optical system 53 is different from the illumination optical system 16 in including, as a first optical system, a cylindrical lens 51 (first optical element) instead of the lens 12. Further, the illumination optical system 53 is also different from the illumination optical system 16 in including, as a second optical system, a light collecting lens 52 (second optical element) instead of the lens 14 and the cylindrical lens 15.

The cylindrical lens 51 that is a first optical system is an optical element that has a refractive power in the x-y plane and does not have a refractive power in the x-z plane. The cylindrical lens 51 collects, on the galvanometer mirror 13, a collimated beam from the light source 11 into a line that is parallel with the rotation axis.

The light collecting lens 52 that is a second optical system is arranged to have a front focal position on the galvanometer mirror 13. From among the illumination beams collected into a line on the galvanometer mirror 13, as illustrated in FIG. 3A, a beam that is seen in the x-z plane in which light is not collected on the galvanometer mirror 13 is collected on a specimen by the light collecting lens 52. On the other hand, as illustrated in FIG. 3B, a beam that is seen in the x-y plane in which light is collected on the galvanometer mirror 13 is collimated by the light collecting lens 52. In other words, similarly to the illumination optical system 16, the illumination optical system 53 is configured to form a sheet-shaped illumination beam that is collected in the x-z plane and that has a width in the y-axis direction.

The rotation axis of the galvanometer mirror 13 is preferably located on the reflection surface of the galvanometer mirror 13 or in the proximity of it. Further, the cylindrical lens 51 (first optical system) is preferably configured to collect an illumination beam from the light source 11 into a line substantially on the rotation axis of the galvanometer mirror 13, so that the position of the linear illumination beam is identical with the approximate position of the rotation axis of the galvanometer mirror 13. Furthermore, the lens 52 is preferably configured to have a front focal position substantially on the rotation axis of the galvanometer mirror 13.

The light sheet illumination device 50 and the microscope apparatus according to the present embodiment that are configured as described above, too, permit obtaining of the advantage similar to that of the light sheet illumination device 10 and the microscope apparatus 1. Further, the light sheet illumination device 50 permits configuring of an illumination optical system with fewer optical elements as compared to the light sheet illumination device 10.

Figure 4A:
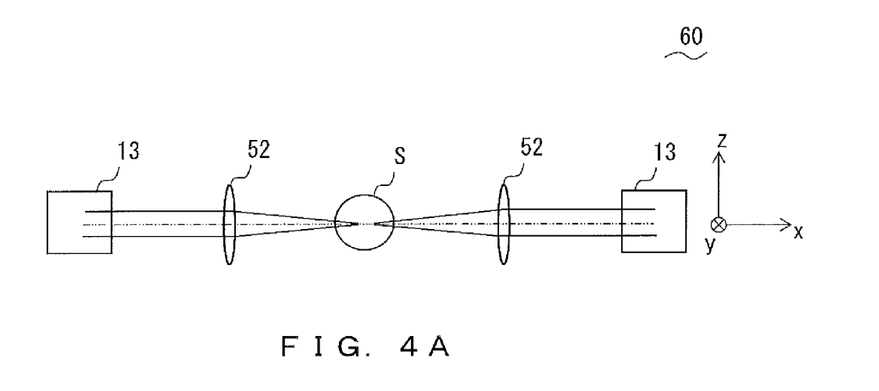
FIG. 4A illustrates the configuration of the light sheet illumination device as viewed from the side.
Figure 4B:
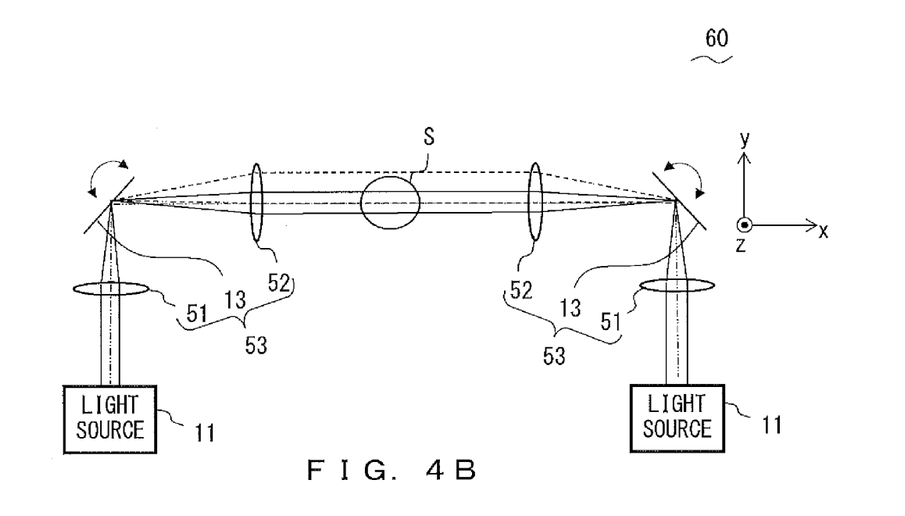
FIG. 4B illustrates the configuration of the light sheet illumination device as viewed from above.

Various modifications may also be made to the light sheet illumination device 50 and the microscope apparatus according to the present embodiment, as is the case with the light sheet illumination device 10 and the microscope system 1. Further, the light sheet illumination device 50 has a single illumination optical path, but, instead of the light sheet illumination device 50, the microscope apparatus according to the present embodiment may include a light sheet illumination device 60 that has a plurality of illumination optical paths, as illustrated in FIGS. 4A and 4B, so as to illuminate the specimen S alternatively from the two illumination optical paths. The light sheet illumination device 60 includes one configuration that is similar to that of the light sheet illumination device 50 on each of both sides of the position in which the specimen S is arranged.

Figure 5A:
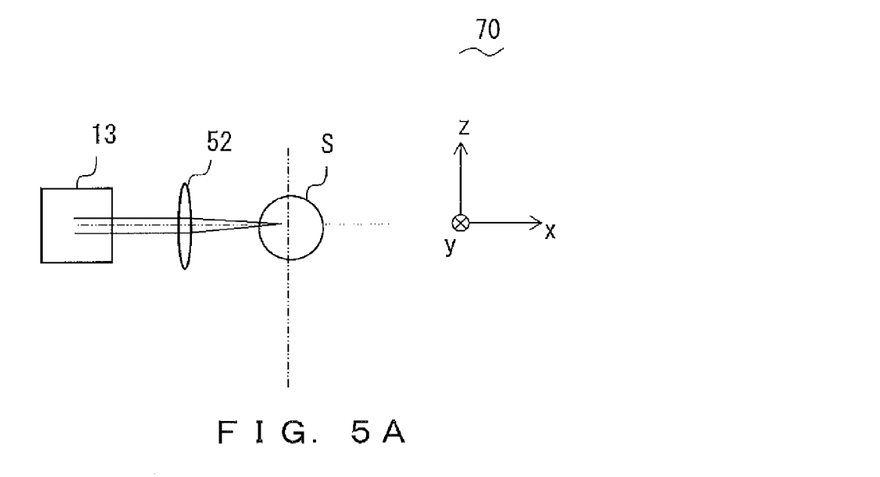
FIG. 5A illustrates the configuration of the light sheet illumination device as viewed from the side.
Figure 5B:
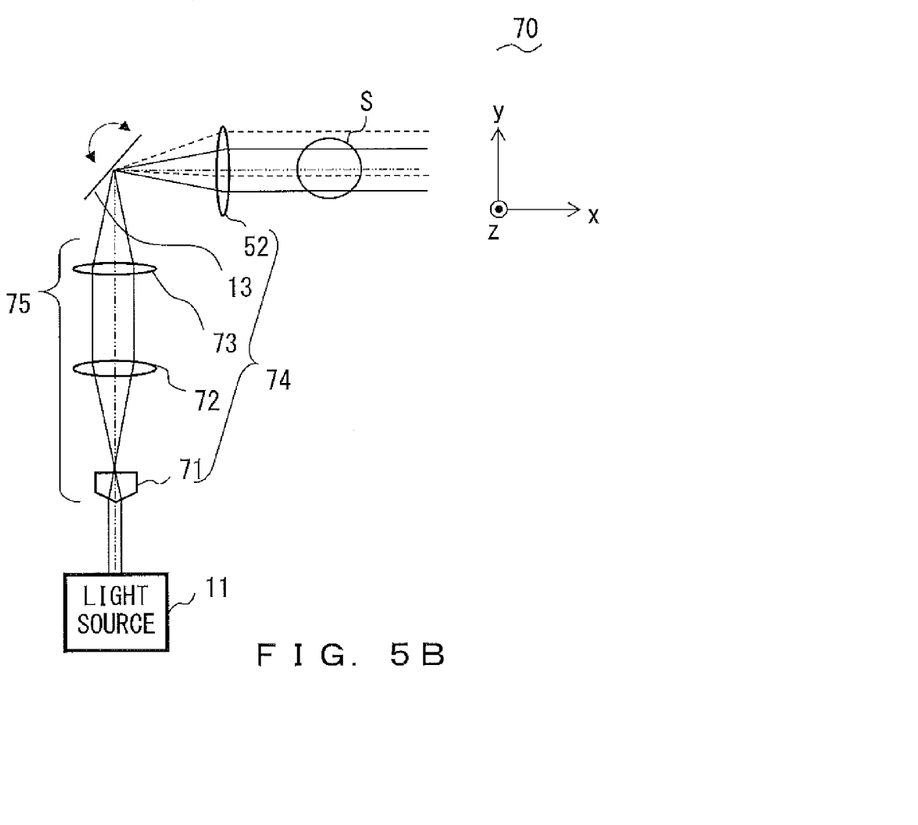
FIG. 5B illustrates the configuration of the light sheet illumination device as viewed from above.

Further, the light sheet illumination device 50 includes the cylindrical lens 51 as a first optical element. However, it is sufficient if the first optical element has a refractive power in a single direction that is perpendicular to the optical axis and does not have a refractive power in a direction that is perpendicular to both that single direction and the optical axis, so the first optical element is not limited to the cylindrical lens 51. Instead of the light sheet illumination device 50, the microscope apparatus according to the present embodiment may include a light sheet illumination device 70 that includes a Powell lens 71 as a first optical element, as illustrated in FIGS. 5A and 5B. The light sheet illumination device 70 is different from the light sheet illumination device 50 in including an illumination optical system 74 instead of the illumination optical system 53. Further, the illumination optical system 74 is different from the illumination optical system 53 in including, as a first optical system 75, the Powell lens 71, a relay lens 72, and a relay lens 73 instead of the cylindrical lens 51. The Powell lens 71 is similar to the cylindrical lens 51 in having a refractive power in a single direction that is perpendicular to the optical axis and not having a refractive power in a direction that is perpendicular to both that single direction and the optical axis. However, the cylindrical lens 51 forms a beam that is converged in a single direction in which the cylindrical lens 51 has a refractive power, and the Powell lens 71 forms a beam that is diverged in a single direction in which the Powell lens 71 has a refractive power. With respect to this point, the Powell lens 71 is different from the cylindrical lens 51.

Third Embodiment

Figure 6A:
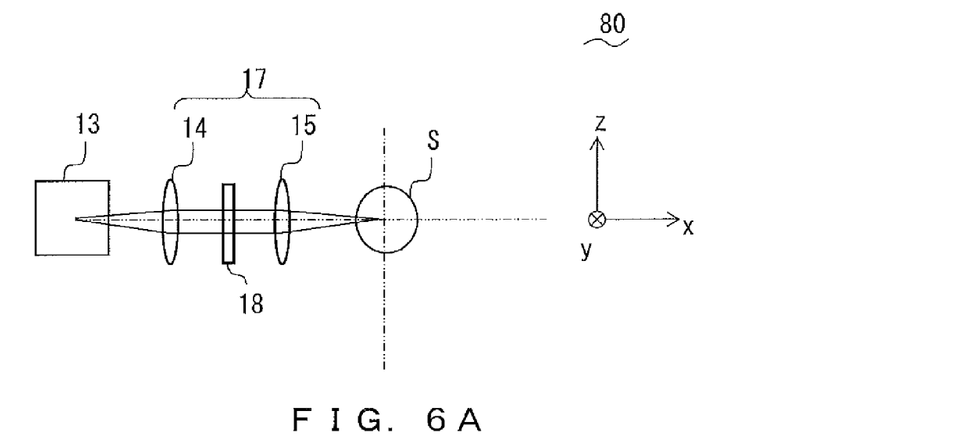
FIG. 6A illustrates the configuration of the light sheet illumination device as viewed from the side.
Figure 6B:
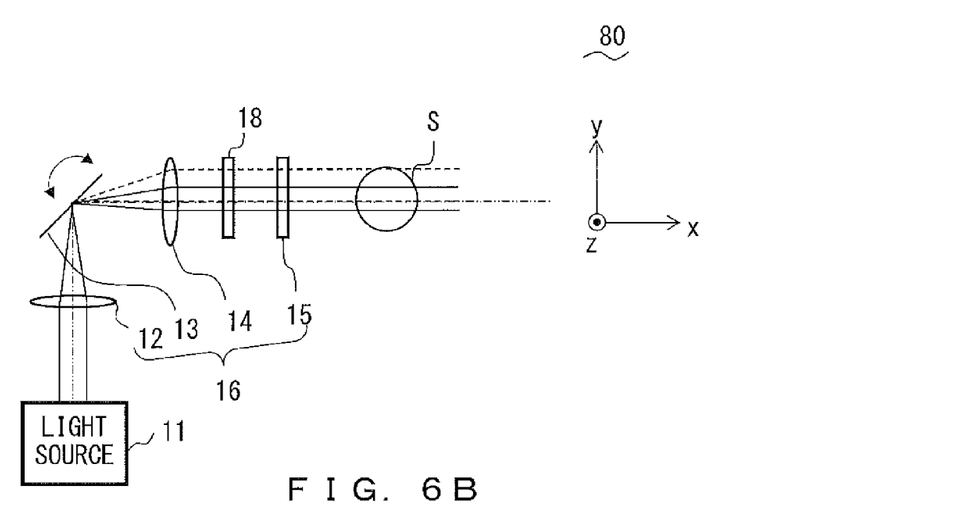
FIG. 6B illustrates the configuration of the light sheet illumination device as viewed from above.

FIGS. 6A and 6B illustrate a configuration of a light sheet illumination device 80 according to the present embodiment. A microscope apparatus according to the present embodiment is a light sheet illumination microscope, and is similar to the microscope apparatus 1 except for including the light sheet illumination device 80 instead of the light sheet illumination device 10 of the microscope apparatus 1. Thus, the detailed description of the microscope apparatus according to the present embodiment will be omitted.

The light sheet illumination device 80 is different from the light sheet illumination device 10 in including a pupil modulation element 18 in a plane in which an infinite beam is collected when the infinite beam has entered the second optical system 17 from the side of the specimen S, that is, in the front focal plane of the cylindrical lens 15. With respect to the other points, it is similar to the light sheet illumination device 10. The front focal plane of the cylindrical lens 15 is a plane in which an infinite beam is collected into a line when the infinite beam has entered in the cylindrical lens 15 from the side of the specimen S.

The pupil modulation element 18 may be a phase modulation element that modulates a phase of light, or may be an amplitude modulation element that modulates an amplitude of light. The pupil modulation element 18 that is a phase modulation element is, for example, a device, such as LCOS™, in which a plurality of independently controllable pixel components are two-dimensionally arranged. Further, it may be a substrate in which a particular pattern for a phase modulation is formed. If the light sheet illumination device 80 includes the pupil modulation element 18 that is a phase modulation element, it is possible to correct the aberration of an illumination beam caused on the specimen S. Moreover, the pupil modulation element 18 that is an amplitude modulation element is, for example, a device, such as LCOS™ and DMD™, in which a plurality of independently controllable pixel components are two-dimensionally arranged. Further, it may be a substrate in which a particular pattern for an amplitude modulation is formed. If the light sheet illumination device 80 includes the pupil modulation element 18 that is an amplitude modulation element, it is possible to change the intensity distribution of illumination beam so as to adjust a numerical aperture (NA) with respect to an illumination, and then, a focal depth that is defined by an illumination light (that is, a focal depth with respect to an illumination). In this case, the pupil modulation element 18 has an identical modulation pattern in the y-axis direction and a different modulation pattern in the z-axis direction, so that a beam scanning by the galvanometer mirror 13 does not influence the modulations.

The light sheet illumination device 80 and the microscope apparatus according to the present embodiment that are configured as described above, too, permit obtaining of the advantage similar to that of the light sheet illumination device 10 and the microscope system 1. Further, the light sheet illumination device 80 permits adjusting of a state of the illumination beam with which the specimen S is irradiated.

Various modifications may also be made to the light sheet illumination device 80 and the microscope apparatus according to the present embodiment, as is the case with the light sheet illumination device 10 and the microscope system 1. Further, the light sheet illumination device 80 may include the Powell lens 71 as a first optical element, as is the case with the light sheet illumination device 70.

Fourth Embodiment

Figure 7A:
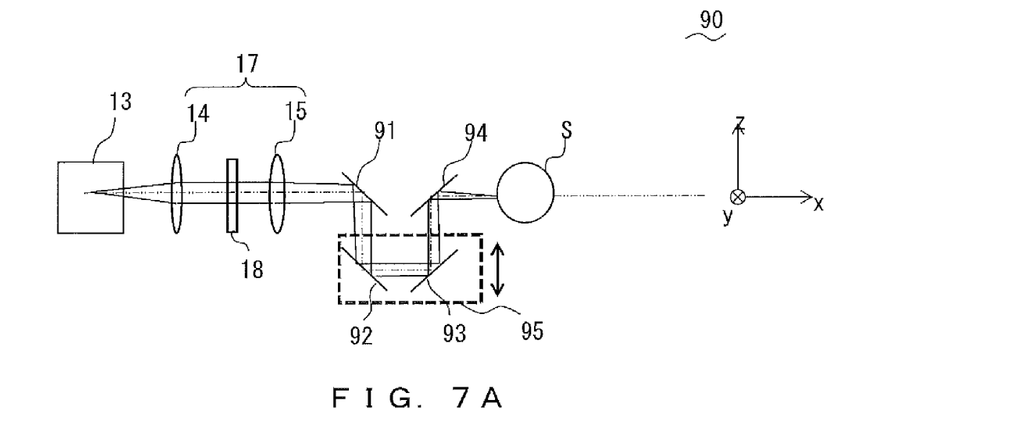
FIG. 7A illustrates the configuration of the light sheet illumination device as viewed from the side.
Figure 7B:
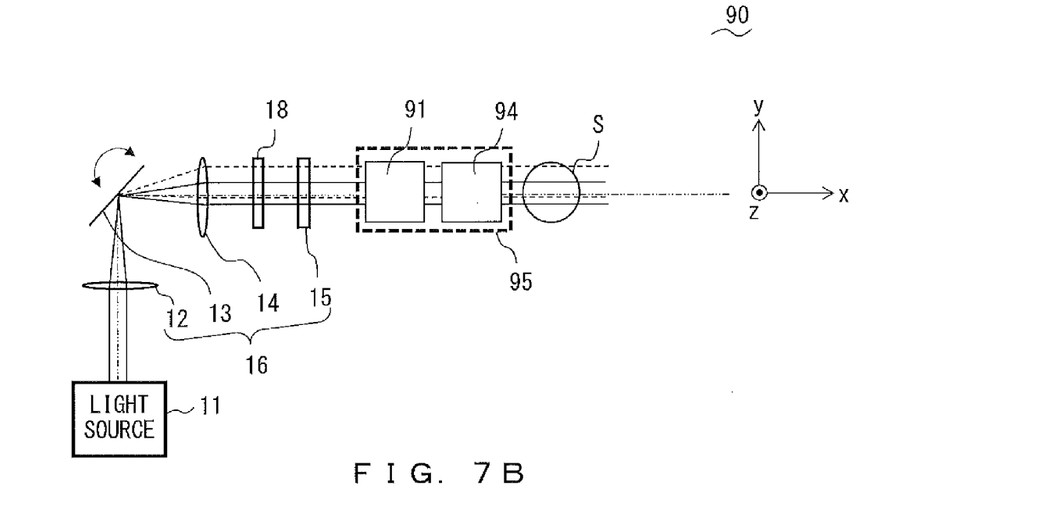
FIG. 7B illustrates the configuration of the light sheet illumination device as viewed from above.

FIGS. 7A and 7B illustrate a configuration of a light sheet illumination device 90 according to the present embodiment. A microscope apparatus according to the present embodiment is a light sheet illumination microscope, and is similar to the microscope apparatus according to the third embodiment except for including the light sheet illumination device 90 instead of the light sheet illumination device 80. Thus, the detailed description of the microscope apparatus according to the present embodiment will be omitted.

The light sheet illumination device 90 is different from the light sheet illumination device 80 in including a light-collecting-position variable mechanism 95, a mirror 91, and a mirror 94 between the cylindrical lens 15 (illumination optical system 16) and the specimen S.

The light-collecting-position variable mechanism 95 is a mechanism that changes the position in which the specimen S is illuminated by a sheet-shaped illumination beam to the optical-axis direction (on the exit side) of the illumination optical system 16, by varying the light collection position of the sheet-shaped illumination beam that is formed by the illumination optical system 16. The light-collecting-position variable mechanism 95 includes a mirror 92 and a mirror 93 that are configured movably in the z-axis direction. The light-collecting-position variable mechanism 95 changes the optical path length between the mirror 91 and the mirror 92 and the optical path length between the mirror 93 and the mirror 94 by moving the mirror 92 and the mirror 93 in the z-axis direction.

The light sheet illumination device 90 and the microscope apparatus according to the present embodiment that are configured as described above, too, permit obtaining of the advantage similar to that of the light sheet illumination device 80 and the microscope apparatus that includes the light sheet illumination device 80. Further, the light sheet illumination device 90 permits suppressing of the influence of chromatic aberration and collecting of an illumination beam in any position of the specimen S by changing the focal position according to the wavelength of the illumination beam by use of the light-collecting-position variable mechanism 95. Furthermore, when only moving a flat mirror to change the light collecting position by use of the light-collecting-position variable mechanism 95, none of the other optical elements that have power and that constitute the illumination optical system 16 is moved. Thus, the pupil modulation element 18 is maintained in a pupil position, regardless of the light collecting position changed by the light-collecting-position variable mechanism 95, that is, of a position to be illuminated. Accordingly, the advantage provided by the pupil modulation element 18 remains constant. As a result, for the light sheet illumination device 90 including the pupil modulation element 18, the light-collecting-position variable mechanism. 95 is preferable as a mechanism for varying a light collection position.

Various modifications may also be made to the light sheet illumination device 90 and the microscope apparatus according to the present embodiment, as is the case with the light sheet illumination device 80 and the microscope apparatus that includes the light sheet illumination device 80.

Fifth Embodiment

Figure 8A:
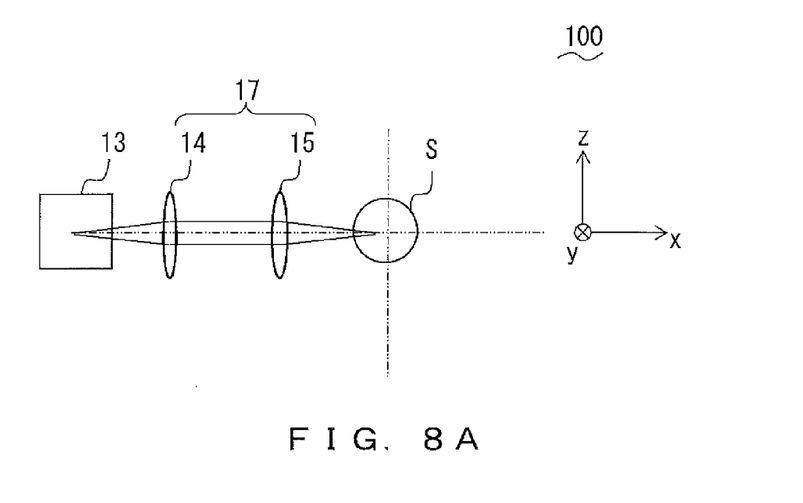
FIG. 8A illustrates the configuration of the light sheet illumination device as viewed from the side.
Figure 8B:
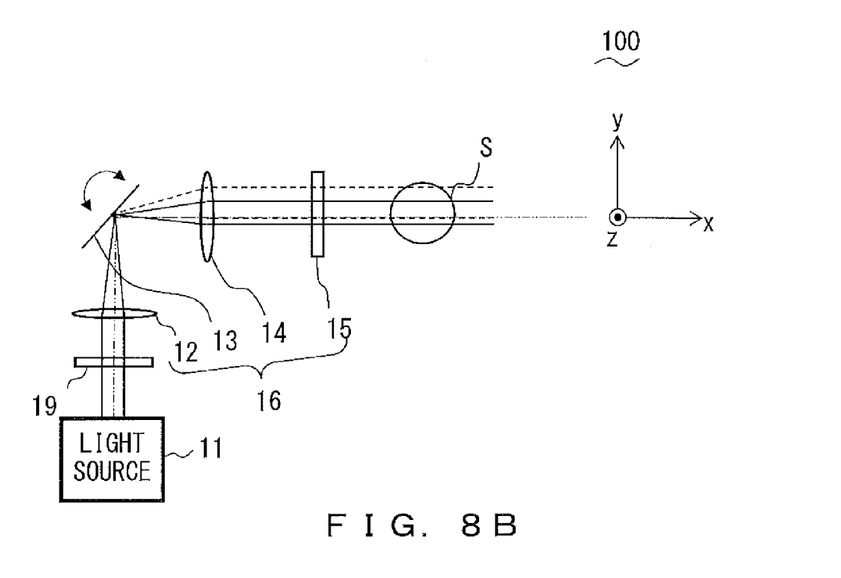
FIG. 8B illustrates the configuration of the light sheet illumination device as viewed from above.

FIGS. 8A and 8B illustrate a configuration of a light sheet illumination device 100 according to the present embodiment. A microscope apparatus according to the present embodiment is a light sheet illumination microscope, and is similar to the microscope apparatus according to the third embodiment except for including the light sheet illumination device 100 instead of the light sheet illumination device 80. Thus, the detailed description of the microscope apparatus according to the present embodiment will be omitted.

The light sheet illumination device 100 is different from the light sheet illumination device 80 in including a pupil modulation element 19 in a plane in which an infinite beam is collected when the infinite beam has entered the lens 12 (first optical system) from the side of the specimen S, that is, in the front focal plane of the lens 12, and not in a plane in which an infinite beam is collected when the infinite beam has entered the second optical system 17 from the side of the specimen S. With respect to the other points, it is similar to the light sheet illumination device 80.

The light sheet illumination device 100 and the microscope apparatus according to the present embodiment that are configured as described above, too, permit obtaining of the advantage similar to that of the light sheet illumination device 80 and the microscope system according to the third embodiment.

Various modifications may also be made to the light sheet illumination device 100 and the microscope apparatus according to the present embodiment, as is the case with the light sheet illumination device 80 and the microscope system according to the third embodiment.

Sixth Embodiment

Figure 9A:
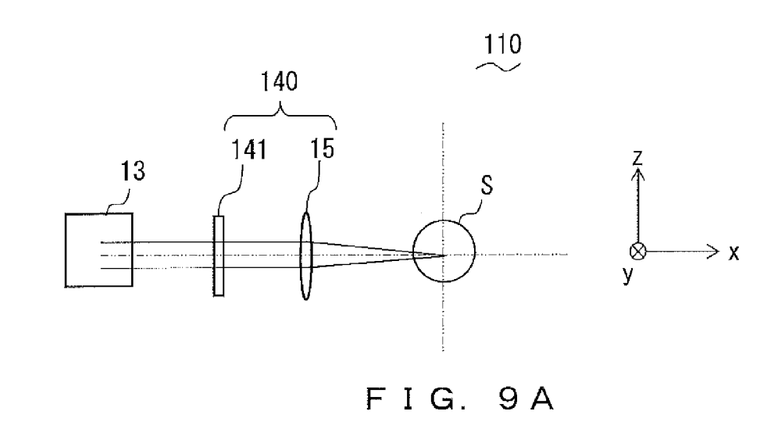
FIG. 9A illustrates the configuration of the light sheet illumination device as viewed from the side.
Figure 9B:
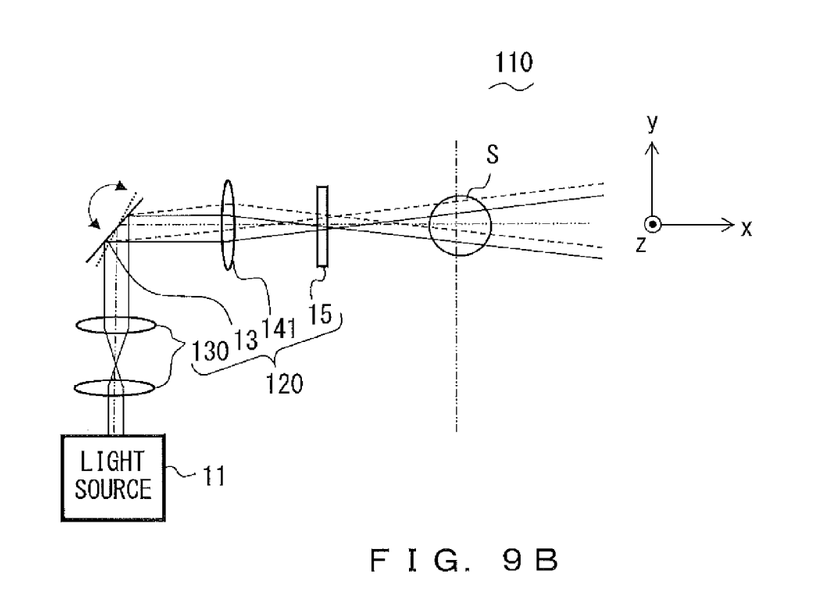
FIG. 9B illustrates the configuration of the light sheet illumination device as viewed from above.

FIGS. 9A and 9B illustrate a configuration of a light sheet illumination device 110 according to the present embodiment. A microscope apparatus according to the present embodiment is a light sheet illumination microscope, and is similar to the microscope apparatus 1 according to the first embodiment except for including the light sheet illumination device 110 instead of the light sheet illumination device 10. Thus, the detailed description of the microscope apparatus according to the present embodiment will be omitted.

The light sheet illumination device 110 is different from the light sheet illumination device 10 in including an illumination optical system 120 instead of the illumination optical system 16. With respect to the other points, it is similar to the light sheet illumination device 10.

The illumination optical system. 120 is similar to the illumination optical system 16 in including the first optical system, the second optical system, and the galvanometer mirror 13. The first optical system is a beam expander 130 that irradiates the galvanometer mirror 13 with a collimated beam.

The second optical system 140 includes a cylindrical lens 141 (second optical element) in a position closest to the galvanometer mirror 13, and further includes the cylindrical lens 15 (first optical element). The cylindrical lens 141 is arranged to have a front focal plane on the galvanometer mirror 13. This configuration permits light to enter, at a constant angle, the cylindrical lens 15 that is arranged in a position closer than that of the cylindrical lens 141 to the specimen S. In other words, the cylindrical lens 15 is arranged in a position at which light enters at a constant angle when the galvanometer mirror 13 scans the specimen S.

The cylindrical lens 141 is an optical element that has a refractive power in the x-y plane and does not have a refractive power in the x-z plane. On the other hand, the cylindrical lens 15 is an optical element that has a refractive power in the x-z plane and does not have refractive power in the x-y plane. In other words, the cylindrical lens 141 does not have a refractive power in a plane in which the cylindrical lens 15 has a refractive power, and has a refractive power in a plane that is perpendicular to the plane in which the cylindrical lens 15 has a refractive power.

In the second optical system 140, first, a collimated beam reflected on the galvanometer mirror 13 is not collected in the x-z plan but is collected only in the x-y plane by the cylindrical lens 141, as illustrated in FIGS. 9A and 9B. Then, the beam obtained by the conversion by the cylindrical lens 141 is also collected in the x-z plane by the cylindrical lens 15. The back focal plane of the cylindrical lens 141 and the back focal plane of the cylindrical lens 15 are different, so the beams that are collected in the different positions, that is, in the x-z plane and the x-y plane are formed.

In this case, the cylindrical lens 15 is arranged such that the back focal plane of the cylindrical lens 15 is located in the proximity of the specimen S so that the thickness of the sheet-shaped beam is sufficiently thin on the specimen S. On the other hand, the cylindrical lens 141 is arranged such that the back focal plane of the cylindrical lens 141 is located between the back focal plane of the cylindrical lens 15 and the cylindrical lens 141. Accordingly, in the light sheet illumination device 110, the specimen S is irradiated with a sheet-shaped illumination beam that has a width in the y-axis direction and that is diverged in the x-z plane.

In the light sheet illumination device 110 that is configured as described above, if the galvanometer mirror 13 changes the deflection direction of an illumination beam, it is possible to scan the specimen S with a sheet-shaped illumination beam formed by the illumination optical system 120. Thus, the light sheet illumination device 110 permits suppressing of fading of the specimen and permits illuminating of a target area to be observed with an appropriate light intensity.

Further, in the light sheet illumination microscope 110, the front focal position of the cylindrical lens 141 is located on the galvanometer mirror 13. Thus, regardless of a rotation angle of the galvanometer mirror 13, an illumination beam is converted by the cylindrical lens 141 into a beam that is parallel with the optical axis of the illumination optical system 120. Accordingly, the illumination beam can be shifted by the galvanometer mirror 13 in the y-axis direction that is perpendicular to the optical-axis direction of the illumination optical system 120, without changing the angle at which the illumination beam enters the specimen S.

Further, in the light sheet illumination microscope 110, a sheet-shaped illumination beam that is formed by the cylindrical lens 15 and that has a width in the y-axis direction is converged by the cylindrical lens 141 in the width direction and collected in front of the specimen S. When the sheet-shaped illumination beam is a collimated beam that has a constant width, if there is a portion where the illumination beam is scattered or absorbed, or a portion where the refractive index is different from the surrounding, light does not reach behind that portion, and then a striped shadow may occur. The light sheet illumination microscope 110 also permits light to enter behind the above-mentioned portion by irradiating the specimen S with a sheet-shaped illumination beam that has been diverged in the width direction. Therefore, it is possible to suppress the occurrence of a shadow on the specimen S.

Various modifications may also be made to the light sheet illumination device 110 and the microscope apparatus according to the present embodiment, as is the case with the light sheet illumination device 10 and the microscope system 1 according to the first embodiment.

The embodiments described above are just examples to facilitate understanding of the present invention, and the invention is not limited to these embodiments. Various modifications and alterations may be made to the light sheet illumination microscope without departing from the spirit and scope of the invention. A combination of some of the features in the embodiments described herein may be provided as a single embodiment. For example, a Powell lens may be used as a first optical element in the light sheet illumination device 10 according to the first embodiment. Further, the galvanometer mirror 13 has been illustrated as a scanner, but the scanner is not limited to the galvanometer mirror if it relatively scans the specimen S with a sheet-shaped illumination beam in the width direction of the sheet. Therefore, the scanner may be an electrical stage, and relative positions of the illumination beam and the specimen S may be changed by moving the specimen S. Furthermore, while in the sixth embodiment, the specimen S is irradiated with a beam diverged in the width direction, the specimen S may be irradiated with a beam converged in the width direction.

What is claimed is:
1. A light sheet illumination microscope comprising:
a detection optical system; and
an illumination optical system that includes a first optical system, a second optical system, and a scanner,
wherein:
the second optical system includes a first optical element for forming a sheet-shaped illumination beam that travels in a first direction that is perpendicular to an optical axis of the detection optical system, the sheet-shaped illumination beam having a width in a second direction that is perpendicular to both the optical axis of the detection optical system and the first direction,
the first optical element has a refractive power in a single direction that is perpendicular to an optical axis of the first optical element and does not have a refractive power in a direction that is perpendicular to both the single direction and the optical axis of the first optical element,
the scanner is configured to scan a specimen in the second direction with the sheet-shaped illumination beam,
the first optical system is configured to irradiate the scanner with an axisymmetric beam, the scanner being positioned on an optical path between the first optical system and the second optical system,
the scanner has a reflection surface rotating around a rotation axis,
the beam with which the first optical system irradiates the scanner is a collimated beam,
the second optical system includes a second optical element having a front focal plane on the scanner, the second optical element being closer to the scanner than any other component in the second optical system, the first optical element is arranged in a position at which light enters at a constant angle when the scanner scans the specimen, the first optical element is closer to the specimen than the second optical element, and the second optical element does not have a refractive power in a plane in which the first optical element has the refractive power, and has a refractive power in a plane that is perpendicular to the plane in which the first optical element has the refractive power.

2. The light sheet illumination microscope according to claim 1, wherein a back focal plane of the second optical element is located between a back focal plane of the first optical element and the second optical element.

* * * * *